United States Patent [19]

Kawakami et al.

[11] Patent Number: 4,558,106

[45] Date of Patent: Dec. 10, 1985

[54] POLYMERIZATION PROCESS USING METAL FORMATE TO REDUCE THE COLOR OF THERMOPLASTIC COPOLYMERS

[75] Inventors: James H. Kawakami, Piscataway; Louis M. Maresca, Belle Mead, both of N.J.

[73] Assignee: Union Carbide Corporation, Danbury, Conn.

[21] Appl. No.: 480,474

[22] Filed: Mar. 29, 1983

[51] Int. Cl.[4] .................................................. C08F 2/00
[52] U.S. Cl. ..................................... 526/216; 528/275; 528/216; 528/199; 528/180; 528/318
[58] Field of Search ............. 525/461; 528/275, 308.8, 528/199, 180, 318; 526/216

[56] References Cited

U.S. PATENT DOCUMENTS 4,229,332  10/1980  Kyo et al. ............................ 524/601
4,247,475  1/1981  Ching ................................... 528/199

FOREIGN PATENT DOCUMENTS 5783524  11/1980  Japan .................................... 528/275

OTHER PUBLICATIONS

Chem. Abstracts vol. 82, Entry 59097H.

*Primary Examiner*—Joseph L. Schofer
*Assistant Examiner*—Peter F. Kulkosky
*Attorney, Agent, or Firm*—Donald M. Papuga

[57] ABSTRACT

Described is a process for improving the color of thermoplastic polymers by contacting the monomer(s) before or during polymerization with an alkali or alkaline earth metal formate.

32 Claims, No Drawings

POLYMERIZATION PROCESS USING METAL FORMATE TO REDUCE THE COLOR OF THERMOPLASTIC COPOLYMERS

BACKGROUND OF THE INVENTION

Described herein is a process for improving the color of thermoplastic polymers by contacting the monomer(s) before or during polymerization or the polymer after its formation with an alkali or alkaline earth metal formate.

Thermoplastic polymers such as a polyarylate, poly(etherimide), polyester, aromatic polycarbonate, poly(aryl ether), etc., are high temperature, high performance thermoplastic polymers with a good combination of thermal and mechanical properties. However, many of the processes and/or raw materials used to produce these polymers can result in the production of a highly colored polymer. For example, polyarylates produced by the diacetate process have a tendency to be colored. Such colored polymers could be unsuitable for use in some end use applications.

Carboxylic acid salts have been used to improve the thermal stability and crazing resistance of aromatic copolyesters as described in U.S. Pat. No. 4,229,332. The polyester in said patent is prepared by an acid chloride process, and it is highly probable that these carboxylic acid salts, such as sodium acetate neutralize the residual hydrochloric acid or acid end groups to improve the thermal stability and crazing resistance of the polyester in boiling water. Such carboxylic acid salts have also been used to prevent the discoloration of polyacetal by scavenging the strong acid catalysts. (Chem. Abs. 82:59097h, Japan Kokai No. 74,99,339).

Therefore, it was surprising that alkali or alkaline earth metal formates, such as sodium or potassium formate when used as an additive in the polymerization of thermoplastic polymers, particularly polyarylates produced by the diacetate process in the absence of a strong acid catalyst, lowered the color of the corresponding polymer significantly. However, this is not a process where all carboxylic acid salts have a beneficial effect on the color of the polymer. For example, sodium acetate does not reduce the color of the polymers, particularly polyarylates produced by the diacetate process. Therefore, the sodium formate appears to bleach polyarylates by a mechanism different from the typical acid neutralization process which prevents the decomposition and degradation reactions in other systems. Potassium formate also bleaches the polyarylate, but zinc formate results in a darker polyarylate than one with no additive. The utility of the metal formate seems to depend on its thermal and oxidative stability properties.

DESCRIPTION OF THE INVENTION

It has now been found that by contacting monomer(s) before or during polymerization with an alkali or alkaline earth metal formate, or mixtures thereof, the color of the resultant thermoplastic polymer is improved.

The optimum amount of metal formate needed for bleaching polyarylates and other polymers will depend on the solubility, stability, and reactivity in that particular system. The best results for bleaching polyarylates were obtained at approximately 0.3% versus the weight of the polymer. Because the metal formate is consumed by thermal and oxidative processes and by conversion to formic acid by reacting with the iso and terephthalic acids, the optimum amount of metal formate needs to be adapted to that particular reactor system. Formic acid at comparable concentrations did not bleach the polyarylate effectively so it appears that the metal formate itself is the bleaching agent.

The monomer(s) before or during polymerization is treated with about 0.001 to 2.0 weight percent, preferably from about 1000 parts per million to about 7000 parts per million of the alkali or alkaline earth metal formates.

The thermoplastic polymers which may be bleached by the process of this invention include one or more of a polyarylate, a polyetherimide, a polyester polymer, an aromatic polycarbonate including polyestercarbonate, a styrene polymer, an alkyl acrylate polymer, a polyurethane, a vinyl chloride polymer, a poly(aryl ether), a copolyetherester block polymer, a polyhydroxyether, and the like, or combinations thereof.

A. Polyarylates

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

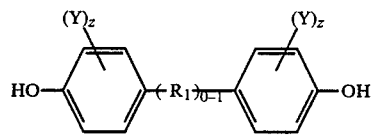

wherein Y is selected from, hydrogen, alkyl groups of 1 to 4 carbon atoms, chlorine or bromine, each z, independently, has a value of from 0 to 4, inclusive, and $R_1$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

B. Polyetherimides

The polyetherimides suitable for use in this invention are well known in the art and are described in, for example, U.S. Pat. Nos. 3,847,867, 3,838,097 and 4,107,147. The polyetherimides are of the following formula:

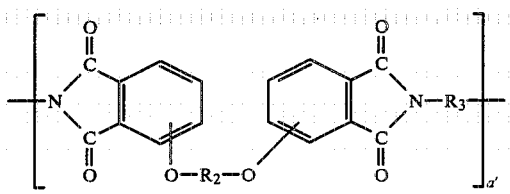
(I)

wherein a' is an integer greater than 1, preferably from about 10 to about 10,000 or more, —O—$R_2$—O— is attached to the 3 or 4 and 3' or 4' positions and $R_2$ is selected from (a) a substituted or unsubstituted aromatic radical such as

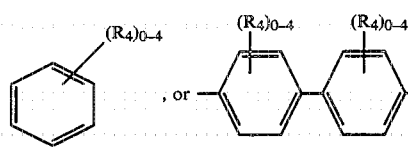

(b) a divalent radical of the formula:

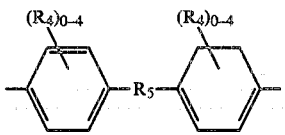

wherein $R_4$ is independently $C_1$ to $C_6$ alkyl, aryl or halogen and $R_5$ is selected from —O—, —S—,

—$SO_2$—, —SO—, alkylene of 1 to 6 carbon atoms, cycloalkylene of 4 to 8 carbon atoms, alkylidene of 1 to 6 carbon atoms or cycloalkylidene of 4 to 8 carbon atoms, $R_3$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formula

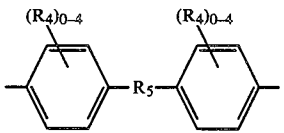

wherein $R_4$ and $R_5$ are as previously defined.

The polyetherimides may also be of the following formula:

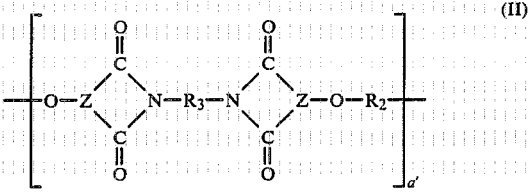
(II)

wherein —O—Z is a member selected from

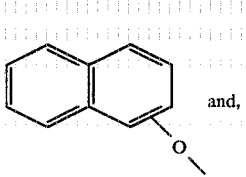
(a)

wherein $R_6$ is independently hydrogen, lower alkyl or lower alkoxy

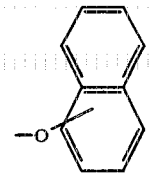 and,
(b)

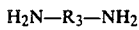
(c)

wherein the oxygen may be attached to either ring and located ortho or para to one of the bonds of the imide carbonyl groups, $R_2$ and $R_3$ and a' are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (I) can, for example, be obtained by any of the methods well-known to those skilled in the art including the reaction of any aromatic bis(ether anhydride)s of the formula

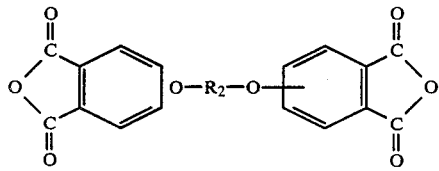
(III)

where $R_2$ is as defined hereinbefore, with a diamino compound of the formula $$H_2N—R_3—NH_2 \qquad (IV)$$

where $R_3$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° to about 250° C. Alternatively, the polyetherimides can be prepared by melt polymerization of any dianhydrides of Formula III with any diamino compound of Formula IV while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerizations can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides of Formula I have an intrinsic viscosity [n] greater than 0.2 deciliters per gram, preferably 0.35 to 0.60, or 0.7 deciliters per gram or even higher when measured in m-cresol at 25° C.

The aromatic bis(ether anhydride)s of Formula III include, for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; etc. and mixures of such dianhydrides.

The organic diamines of Formula IV include, for example, m-phenylenediamine, p-phenylenediamine, 2,2-bis(p-aminophenyl)propane, 4,4'-diaminodiphenylmethane, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, The polyetherimides of formula (III) may, for example, be prepared by effecting reaction in the presence of a dipolar aprotic solvent of a mixture of ingredients comprising, for instance, (1) a bis(nitrophthalimide) of the general formula:

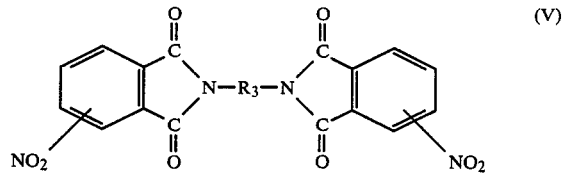

wherein $R_3$ is defined as hereinabove, and (2) an alkali metal salt of an organic compound of the general formula:

$$MO-R_2-OM \qquad (VI)$$

wherein M is an alkali metal and $R_2$ is defined as hereinabove.

The bis(nitrophthalimide) used in preparing the polymer is formed by reacting a diamine of the formula described above, $NH_2-R_3-NH_2$, with a nitro-substituted aromatic anhydride of the formula:

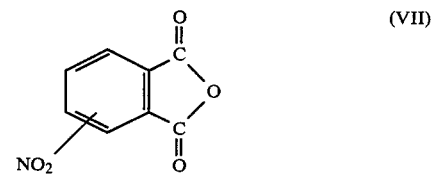

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalenedicarboxylic anhydride and 3-methoxy-6-nitrophthalic anhydride, and the like.

With reference to the alkali metal salts of formula VI among the divalent carbocyclic aromatic radicals which $R_2$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g. hydroquinone, resorcinol, chlorohydroquinone, etc. In addition, $R_2$ may be a residue of a dihydroxy diarylene compound in which the aryl nuclei are joined by either an aliphatic group, a sulfoxide group, sulfonyl group, sulfur, carbonyl group, oxygen, etc. Typical of such diarylene compounds are the following:

2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;

1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;

2,2-bis(4-hydroxynaphthyl)propane;
hydroquinine;
naphthalene diols;
bis(4-hydroxyphenyl)ether;
bis(4-hydroxyphenyl)sulfide;
bis(4-hydroxyphenyl)sulfone; and the like.

When dialkali metal salts of formula VI are used with the compound illustrated by formula V, the ingredients are advantageously present in an equal molar ratio for optimum molecular weight and properties of the polymer. Slight molar excesses, e.g., about 0.001 to 0.10 molar excess of either the dinitro-substituted organic compound or of the dialkali metal salt of formula (VI) may be employed. When the molar ratios are approximately equal, the polymer is substantially terminated by a=Z—NO$_2$ at one end and a phenolic group at the other end. If there is a molar excess of one compound, that particular terminal group will predominate.

The conditions of reaction whereby the alkali-metal salt of formula VI is reacted with the dinitro-substituted organic compound of formula V can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed as precipitants for this purpose.

It is important that the reaction between the dinitro-substituted organic compound of formula V and the alkali-metal salt of formula VI (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10 to 20% by weight of polymer is preferably employed.

The preferred polyetherimides include those having repeating units of the following formula:

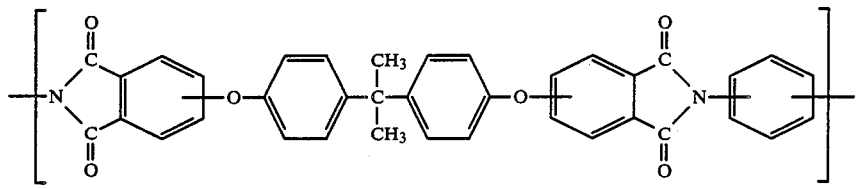

C. Polyesters

The polyesters which are suitable for use herein are derived from an aliphatic or cyloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

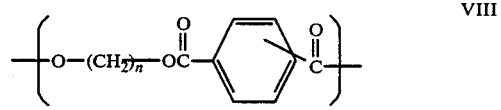

wherein n is an integer of from 2 to 10.

The preferred polyester is poly(ethylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis - or trans-isomer (or mixtures thereof) of, for example, 1,4-cyclohexanedimethanol with an aromatic dicarboxylic acid so as to produce a polyester having recurring units of the following formula:

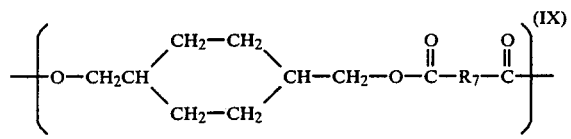

wherein the cyclohexane ring is selected from the cis- and trans- isomers thereof and R$_7$ represents an aryl radical containing 6 to 20 carbon atoms and which is the decarboxylated residue derived from an aromatic dicarboxylic acid.

Examples of aromatic dicarboxylic acids indicated by R$_7$ in formula IX, are isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present, such as in 1,4-or 1,5-naphthalenedicarboxylic acids. The preferred dicarboxylic acids are terephthalic acid or a mixture of terephthalic and isophthalic acids.

A preferred polyester may be derived from the reaction of either the cis-or trans-isomer (or a mixture thereof) of 1,4-cyclohexanedimethanol with a mixture of isophthalic and terephthalic acids. These polyesters have repeating units of the formula:

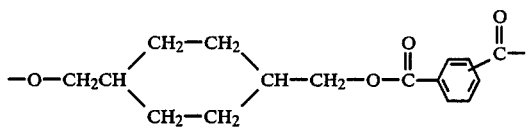
(X)

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

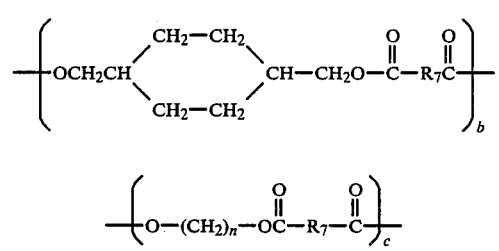
(XI)

wherein the cyclohexane ring is selected from the cis- and trans- isomers thereof, $R_7$ is as previously defined, n is an integer of 2 to 10, the b units comprise from about 10 to about 90 percent by weight and the c units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

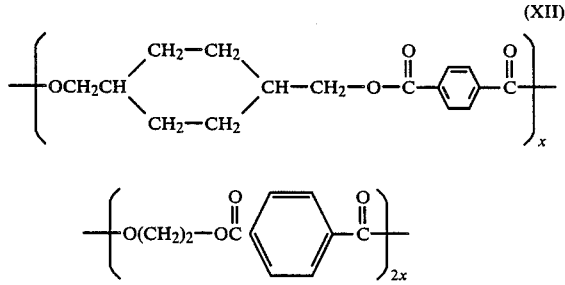
(XII)

wherein x can be 10 to 10,000. Block as well as random copolymers are possible.

The polyester as described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23° to 30° C.

D. Aromatic Polycarbonate

The thermoplastic aromatic polycarbonates that can be employed herein are homopolymers and copolymers and mixtures thereof, which have an intrinsic viscosity of from about 0.4 to about 1.0 dl./g. as measure in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)-propane, 4,4-bis(4-hydroxyphenyl)heptane, 2-2-(3,5,3′, 5′tetrabromo-4,4′-dihydroxydiphenyl)propane, (3,3′-dichloro-4,4′dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(-chloronaphthyl)carbonate, etc. or mixtures thereof. The haloformates suitable for use herein include bishaloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used.

Also, aromatic polyester carbonates may be used. These are described in, for example, U.S. Pat. No. 3,169,121. The preferred polyester carbonate results from the condensation of phosgene, terephthaloyl chloride, isophthaloyl chloride with bisphenol-A and a small amount of p-tertbutylphenol.

E. Styrene Resin

The styrene resins suitable for use herein include ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

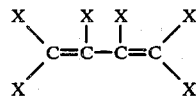

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3,-butadiene, 2-ethyl -1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

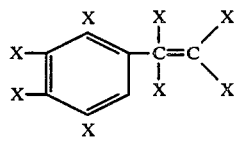

wherein X is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, α-bromostyrene, dichlorostyrene, dibromostyrene, tetra-chlorostyrene, mixtures thereof, and the like. The preferred monovinylaromatic hydrocarbons used are sytrene and/or a α-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The acrylonitrile, substituted acrylonitrile, or acrylic acid esters are described generically by the following formula:

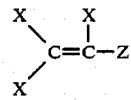

wherein X is as previously defined and Z is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyreneacrylonitrile copolymer. Also, there are occasions where a copolymer, such as α-methylstyreneacrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

F. Poly(Alkyl Acrylate) Resin

The poly(alkyl acrylate) resin which may be used herein includes a homopolymer of methyl methacrylate (i.e., polymethyl methacrylate) or a copolymer of methyl methacrylate with a vinyl monomer (e.g., acrylonitrile, N-allylmaleimide, vinyl chloride or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

G. Polyurethanes

The thermopastic polyurethanes which may be used herein are described in, for example, U.S. Pat. No. 3,214,411. Particularly useful polyester resins used as starting materials for the thermoplastic polyurethanes are those produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed such that the final water content is from about 0.01 to about 0.2%.

Any suitable glycol may be used in the reaction with the adipic acid such as, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol, and the like. In addition to the glycols, a small amount of trihydric alcohol of up to about 1% may be used, such as trimethylolpropane, glycerol, hexanetriol, and the like. The resulting hydroxyl polyester has a molecular weight of at least about 600, a hydroxyl number of from about 25 to about 190, and preferably between about 40 to about 60, and acid number of between about 0.5 and about 2 and a water content of 0.01 to about 0.2%.

The diisocyanates which may be used in preparing the polyurethanes include ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate, 2,2'-diphenylmethane diisocyanate, 2,2-diphenylpropane-4,4'diisocyanate, p-phenylene diisocyanate, m-phenylene diisocyanate, xylylene diisocyanate, 1,4-naphthylene diisocyanate, 1,5-naphthylene diisocyanate, diphenyl-4,4'diisocyanate, azobenzene-4,4'-diisocyanate, diphenyl sulfone-4,4'-diisocyanate, dichlorohexamethylene diisocyanate, pentamethylene diisocyanate, 1-chlorobenzene-2,4-diisocyanate, furfurylidene diisocyanate, and the like.

Any suitable chain extending agent having active hydrogen containing groups reactive with isocyanate groups may be used, such as diols, including ethylene glycol, propylene glycol, 1,4-butanediol, butenediol, butynediol, xylylene glycols, amylene glycols, 1,4-phenylene-bis-hydroxy ethyl ether, 1,3-phenylene-bis-hydroxyethyl ether, bis-(hydroxy-methylcyclohexane), hexanediol, and the like; diamines, including ethylene diamine, cyclohexylene diamine, phenylene diamine, tolylene diamine, xylylene diamine, 3,3'-dichlorobenzidine, 3,3'-dinitrobenzidine and the like; alkanol amines such as ethanol amine, aminopropyl alcohol, 2,2-dimethyl propanol amine, 3-aminocyclohexyl alcohol, p-aminobenzyl alcohol, and the like.

If desired, a small amount of polyfunctional material may be utilized. This polyfunctional chain extender, however, should not be present in an amount greater than about 1% by weight. Any suitable polyfunctional compound may be used such as glycerol, trimethylolpropane, hexanetriol, pentaerythritol, and the like.

The polyester, the organic diisocyanate and the chain extender may be individually heated to a temperature of from about 60° to about 135° C. and then the polyester and chain extender are substantially simultaneously mixed with the diisocyanate. To increase the rate of reaction, any suitable catalyst may be used, such as tertiary amines and the like. Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like. Polyesters based on alpha-caprolactone are also preferred.

A polyether may be used instead of the polyester in the preparation of the thermoplastic polyurethanes and preferably, polytetramethylene glycol having an average molecular weight between about 60 and about 2000. Other polyethers, such as polypropylene glycol, polyethylene glycol and the like may be used providing their molecular weight is about 600.

The thermoplastic polyurethanes are described in, for example, U.S. Pat. Nos. 2,621,166, 2,729,618, 3,214,411, 2,778,810 and 3,012,992.

H. Vinyl Chloride Polymers

The vinyl chloride polymers suitable for use herein are polyvinyl chloride and copolymers of vinyl chloride with olefinically unsaturated polymerizable compounds which contain at least 80 percent by weight of vinyl chloride incorporated therein.

Olefinically unsaturated compounds which are suitable for copolymerization include vinylidene halides, such as vinylidene chloride and vinylidene fluoride, vinyl esters, such as vinyl acetate, vinyl propionate, vinyl butyrate, vinyl chloroacetate, vinyl benzoate, acrylate and alkyl-acrylate and their alkyl esters, amides and nitriles, methacrylic acid, maleic acid or anhydride, methyl methacrylate, ethyl acrylate, 2-ethyl-hexyl-acrylate, butyl methacrylate, 2-hydroxypropyl acrylate, acrylamide, N-methyl acrylamide, acrylonitrile and methacrylonitrile, aromatic vinyl compounds, such as styrene and vinyl naphthalene and olefinically unsaturated hydrocarbons such as ethylene, bicyclo-[2,2,1]-hept-2-ene and biocyclo-[2,2,1]-hepta-2,5-diene. Polymerized vinyl acetate may be hydrolyzed to provide vinyl alcohol moieties in the polymer.

These vinyl chloride polymers are well known in the art and can be prepared by the usual methods of solution, emulsion, suspension, bulk or mass polymerization.

Vinyl chloride polymers which have molecular weights of at least about 40,000 are preferred.

I. Poly(aryl ether)s

The poly(aryl ether) resin components suitable for use herein are linear, thermoplastic polyarylene polyethers containing recurring units of the following formula:

—O—E—O—E′— wherein E is the residuum of a dihydric phenol, and E′ is the residuum of a benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxphenyl)2-phenyl ethane, bis(4-hydroxyphenyl)methane, or their chlorinated derivatives containing one or two chlorines on each aromatic ring. Other materials also termed appropriately "bisphenols" are also highly valuable and preferred. These materials are the bisphenols of a symmetrical or unsymmetrical joining group, as, for example, ether oxygen (—O—), carbonyl

sulfone

or hydrocarbon residue in which the two phenolic nuclei are joined to the same or different carbon atoms of the residue.

Such dinuclear phenols can be characterized as having the structure:

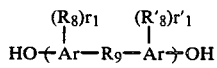

wherein Ar is an aromatic group and preferably is a phenylene group, $R_8$ and $R'_8$ can be the same or different inert substituent groups such as alkyl groups having from 1 to 4 carbons atoms, aryl, halogen atoms, i.e., fluorine, chlorine, bromine or iodine, or alkoxyl radicals having from 1 to 4 carbon atoms, $r_1$ and $r'_1$ are integers having a value of from 0 to 4, inclusive, and $R_9$ is representative of a bond between aromatic carbon atoms as in dihydroxyl-diphenyl, or is a divalent radical, including for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others: the bis-(hydroxyphenyl) alkanes such as
2,2-bis-(4-hydroxyphenyl)propane,
2,4′-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxy-phenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoropropane, and the like;
di(hydroxyphenyl)sulfones such as bis-(4-hydroxyphenyl)sulfone, 2,4′-dihydroxydiphenyl sulfone, 5-chloro-2,4′-dihydroxydiphenyl sulfone, 5′-chloro-4,4′-dihydroxydiphenyl sulfone, and the like;
di(hydroxyphenyl)ethers such as bis-(4-hydroxyphenyl)ether, the 4,3′-, 4,2′-2,2′-2,3-,dihydroxyphenyl ethers, 4,4′-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4′-dihydroxy-3,6-dimethoxydiphenyl ether.

As herein used the E′ term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nuclear. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4′-dichlorodiphenyl sulfone and 4,4′-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

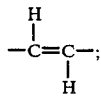

the sulfoxide group

the azo group —N=N—; the saturated fluorocarbon groups

—CF$_2$—CF$_2$CF$_2$—; organic phosphine oxides

where $R_{10}$ is a hydrocarbon group, and the ethylidene group

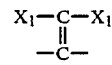

where $X_1$ can be hydrogen or halogen.

If desired, the polymers may be made with mixtures of two or more dihalobenzenoid or dinitrobenzenoid compounds. Thus, the E′ residuum of the benzenoid compounds in the polymer structure may be the same or different.

It is seen also that as used herein, the E′ term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the polyethers may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedure described in Canadian Patent No. 847,963 wherein the bisphenol and dihalobenzenoid compound are heated in the presence of potassium carbonate using a high boiling solvent such as diphenylsulfone.

Preferred polyarylene polyethers of this invention are those prepared using the dihydric polynuclear phenols of the following four types, including the derivatives thereof which are substituted with inert substituent groups (a)
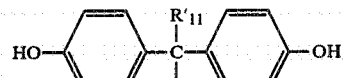

in which the $R'_{11}$ groups represent independently hydrogen, lower alkyl, aryl and the halogen substituted groups thereof, which can be the same or different;

(b)
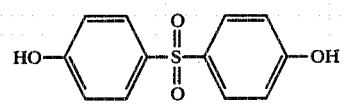

(c)
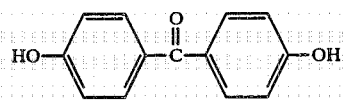

(d)
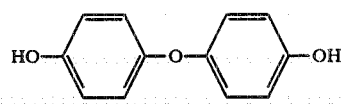

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

The poly(aryl ether)s have a reduced viscosity of from about 0.35 to about 1.5 as measured in an appropriate solvent at an appropriate temperature depending on the particular polyether, such as in methylene chloride at 25° C.

The preferred poly(aryl ether)s have repeating units of the formula:

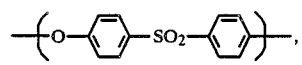

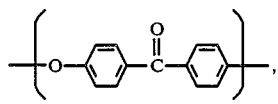

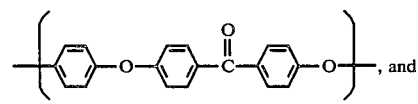, and

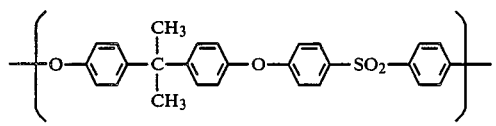

Another preferred poly(aryl ether) is a thermoplastic linear polymer containing recurring units of the formulae:

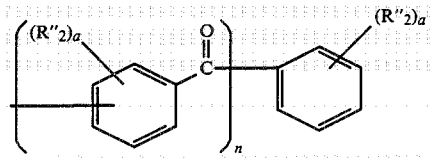

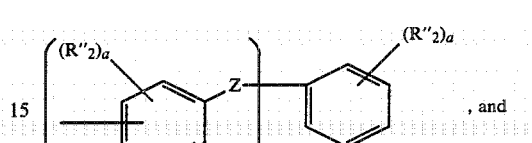, and

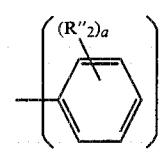

wherein $R''_2$ is independently hydrogen, $C_1$ to $C_6$ alkyl, or $C_4$ to $C_8$ cycloalkyl, a is an integer of 0 to 4, Z is independently $$-\overset{\overset{O}{\|}}{C}-,$$

—SO—, —S—, —SO$_2$—, —O—, alkylene, cycloalkylene, arylene, alkylidene, or cycloalkylidene containing from 2 to 20 carbon atoms, n is independently an integer of from 1 to 5. The units are attached to each other by an —O— bond.

J. Copolyetherester Block Copolymer

The copolyetheresters suitable for use herein are well known in the art and are described in, for example, U.S. Pat. Nos. 3,784,520 and 3,766,146.

The polyester comprises a multiplicity of recurring intralinear long chain and short chain ester units connected head-to tail through ester linkages, said long chain ester units being represented by the following structure:

$$-OGO-\overset{\overset{O}{\|}}{C}R_{12}-\overset{\overset{O}{\|}}{C}- \qquad (XIII)$$

and said short chain ester units being represented by the following structure:

$$-ODO-\overset{\overset{O}{\|}}{C}R_{13}-\overset{\overset{O}{\|}}{C}- \qquad (XIV)$$

wherein G is a divalent radical remaining after removal of terminal hydroxy groups from a poly(alkylene oxide) glycol having a molecular weight of from about 400 to about 3500; D is a divalent radical remaining after removal of hydroxyl groups from a low molecular weight diol having a molecular weight of less than about 250; and $R_{12}$ is a divalent radical remaining after removal of carboxyl groups from a dicarboxylic acid having a molecular weight of less than about 300, with the proviso that the short chain ester units constitute from about 25 to about 65% by weight of the copolyester, at least about 70% of the $R_{13}$ groups are 1,4-phenylene radicals, at least about 70% of the D groups are 1,4-butylene radicals, and the sum of the percentages of the $R_{13}$ groups which are not 1,4-phenylene radicals and of the D groups which are not 1,4-butylene radicals do not exceed about 30%.

The term "long chain ester units" as applied to units in a polymer chain refers to the reaction product of a long chain glycol with a dicarboxylic acid. Such "long chain ester units", which are a repeating unit in the copolyesters herein correspond to the Formula XIII above. The long chain glycols may be poly(alkylene oxide) glycols having a molecular weight between about 400 and about 3500, preferably between about 600 and about 2000. Copolyesters prepared from polyalkylene oxide glycols having a molecular weight between about 600 to about 2000 are preferred.

The term "short chain ester units" as applied to units in a polymer chain refers to low molecular weight compounds or polymer chain units having molecular weight of less than about 550. They are made by reacting a low molecular weight diol (below about 250) with a dicarboxylic acid to form ester units represented by Formula XIV above.

Included among the low molecular weight diols (other than 1,4-butanediol which react to form short chain ester units are acyclic, alicyclic and aromatic dihydroxy compounds. Preferred are diols with from 2 to 15 carbon atoms, such as ethylene, propylene, isobutylene, tetramethylene, pentamethylene, 2,2-dimethyltrimethylene, hexamethylene and decamethylene glycols, dihydroxy cyclohexane, cyclohexanedimethanol, resorcinol, hydroquinone, 1,5-dihydroxy naphthalene, etc. Especially preferred are aliphatic diols containing from 2 to 8 carbon atoms. Included among the bisphenols which can be used are bis(p-hydroxy)diphenyl, bis(p-hydroxyphenyl)methane, and bis(p-hydroxyphenyl)propane.

Dicarboxylic acids (other than terephthalic acid) which are reacted with the foregoing long chain glycols or low molecular weight diols to produce the copolyesters are aliphatic, cycloaliphatic or aromatic dicarboxylic acids.

Representative aliphatic and cycloaliphatic acids which may be used are sebecic acid, 1,3-cyclohexane dicarboxylic acid, 1,4-cyclohexane dicarboxylic acid, adipic acid, glutaric acid, succinic acid, carbonic acid, cyclopentanedicarboxylic acid, decahydro-1,5-naphthylene dicarboxylic acid and 4,4-bicyclohexyl dicarboxylic acid. Preferred cycloaliphatic acids are cyclohexane dicarboxylic acids.

Representative aromatic dicarboxylic acids which may be used are phthalic, terephthalic and isophthalic acids, substituted dicarboxy compounds with two benzene nuclei, such as bis(p-carboxyphenyl) methane and p-carboxyphenyloxybenzoic acid. Among the aromatic acids, those with from 8 to 16 carbon atoms are preferred, particularly the phenylene dicarboxylic acids, i.e., terephthalic and isophthalic acids.

Preferably, at least about 70 mole percent of the dicarboxylic acid incorporated into the polymer is terephthalic acid and at least about 70 mole percent of the low molecular weigh diol incorporated into the polymer is 1,4-butanediol. Thus, at least 70% of the $R_{12}$ groups in Formulae (XIII) and (XIV) above are 1,4-phenylene radicals and at least about 70% of the D groups in Formula XIV above are 1,4-butylene radicals.

The most preferred copolyesters are those prepared from dimethylterephthalate, 1,4-butanediol and poly(tetramethylene oxide) glycol having a molecular weight of from about 600 to about 1500.

The copolyetheresters described herein can be made conveniently by a conventional ester interchange reaction by methods well known in the art and as described in, for example, U.S. Pat. Nos. 3,784,520 and 3,766,146.

K. Polyhydroxyethers

The thermoplastic polyhydroxyethers which may be used herein have the following general formula:

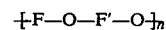

where F is the radical residuum of a dihydric phenol, F' is a radical residuum of an epoxide selected from mono- and diepoxides and which contain from 1 to 2 hydroxyl groups, and n is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

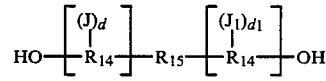

wherein the $R_{14}$'s are independently an aromatic divalent hydrocarbon radical, such as naphthylene and phenylene with phenylene being preferred, J and $J_1$ may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, d and $d_1$ are independently integers of 0 to 4 $R_{15}$ is independently selected from a divalent saturated aliphatic hydrocarbon radical particularly alkylene or alkylidene radicals having from 1 to 8 carbons atoms, especially $C(CH_3)_2$, cycloalkylene, cycloalkylidene or any other divalent group such as O, S, SO, $SO_2$, CO, a chemical bond, etc. Particularly preferred are dihydric polynuclear phenols having the general formula:

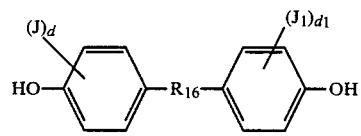

wherein J, $J_1$, d and $d_1$ are as previously defined, and $R_{16}$ is an alkylene or alkylidene group, preferably having from 1 to 3 carbon atoms, cycloalkylene or cycloalkylidene having 6 to 12 carbon atoms.

Diepoxides useful for the preparation of polyhydroxyethers may be represented by repeating units of the following formula:

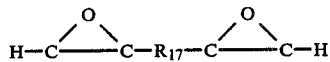

wherein $R_{17}$ is representative of a bond between adjacent carbon atoms or a divalent organic radical such as an aliphatic, aromatic, alicyclic, heterocyclic or acyclic arrangement of atoms.

Other diepoxides which can be mentioned include those wherein two oxirane groups are linked through an aromatic ether, i.e., compounds having the grouping:

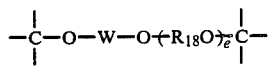

wherein $R_{18}$ is a divalent organic radical, W is a divalent aromatic radical residuum of a dihydric phenol, such as those listed above in the description of dihydric phenols, and e is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,924,747; and 2,777,051.

EXAMPLES

The following examples serve to give specific illustrations of the practice of this invention but they are not intended in any way to limit the scope of this invention.

Control

To a three-necked round bottom flask fitted with a mechanical stirrer, nitrogen inlet, fractionation column, condenser, and round bottom flask receiver was added 8.31 g of isophthalic acid, 8.31 g of terephthalic acid and 31.39 g recrystallized bisphenol A diacetate and 23.87 g diphenylether. The mixture was purged with nitrogen for one hour at 25° C. and then heated to 270° C. The temperature was kept at 270° C. for 11 hours and then cooled to room temperature (about 25° C.). The polymer was dissolved in chloroform to make a 5 weight percent solution, filtered, and a percent transmission determined on a Fischer Electrophotometer II. The color factor was determined from the absorbance by using a correlation equation which converted plaque color to solution color. The plague color factor was determined on a 0.125 inch plaque using the chromaticity diagram (a procedure described in ASTM 1925 and the book by G. Wyszecki et al., titled "Color Science," John Wiley & Sons, Inc., New York, 1967).

EXAMPLES 1 to 6

The bleaching of the polyarylate was effected by adding various amounts of metal formates to the raw materials used in the polyarylate polymerization. The metal salt is filtered off before recovering the polymer by coagulation or solvent devolatilization.

The following Table shows the effect of the use of various amounts of metal formates on the color factor and molecular weight of the polyarylate.

| FORMATE DECOLORIZATION OF POLYARYLATE | | | | |
|---|---|---|---|---|
| EXAMPLE | FORMATE | WT. %** | R.V.* | COLOR FACTOR |
| CONTROL | NONE | — | 0.60 | 73 |
| 1 | SODIUM, | 0.5 | 0.40 | 10 |
| 2 | SODIUM, | 0.3 | 0.60 | 15 |
| 3 | SODIUM, | 0.14 | 0.52 | 31 |
| 4 | POTASSIUM, | 0.35 | 0.67 | 34 |
| 5 | ZINC, | 0.3 | — | 215 |
| 6 | ZINC, | 0.14 | — | 165 |

*RV - Reduced viscosity, 0.5 grams of polymer in 100 ml of chloroform.
**Wt % formate based on polymer weight.

Without any formate additives the average color factor is 73. Note the dramatic decrease in color factor when 0.5% and 0.3% sodium formate was used during the polymerization. At 0.5% levels the molecular weight was lower than normal, but at 0.3% there was both low color and normal molecular weights. Potassium formate seems to be slightly less efficient than sodium formate, but still gives a dramatic decrease in polymer color. Zinc formate actually causes a substantial increase in polymer color. This is believed due to the decomposition of zinc formate at the high polymerization temperatures.

The corresponding acid of the formates, formic acid, did not appear to exhibit the same color reducing effect of the formates. At 0.5% and 0.1% levels of formic acid high color factors of 345 and 108 were obtained. Sodium acetate at 0.34% levels gave polymer color similar to when no additive was used.

What is claimed is:

1. An improved process for producing a thermoplastic polymer selected from the group consisting of a polyarylate, a polyetherimide, an aromatic polycarbonate, a poly(ester carbonate), a styrene polymer, an alkyl acrylate polymer, a polyurethane, a vinyl chloride polymer, a poly(aryl ether), a copolyetherester block polymer, a polyhydroxyether or combinations thereof, wherein the improvement comprises adding an alkali or alkaline earth metal formate or mixtures thereof to monomer(s) before polymerization to reduce the color of the resultant polymer.

2. An improved process for producing a thermoplastic selected from the group consisting of a polyarylate, a polyetherimide, an aromatic polycarbonate, a poly(ester carbonate), a styrene polymer, an alkyl acrylate polymer, a polyurethane, a vinyl chloride polymer, a poly(aryl ether), a copolyetherester block polymer, a Polyhydroxyether or combinations thereof, wherein the improvement comprises adding an alkali or alkaline earth metal formate or mixtures thereof to a polymerization reaction to reduce the color of the resultant polymer.

3. A process as defined in claim 2 wherein the formate is sodium formate.

4. A process as defined in claim 2 where in the formate is potassium formate.

5. A process as defined in claim 2 wherein the thermoplastic polymer is a polyarylate.

6. A process as defined in claim 5 wherein the polyarylate is derived from a dihydric phenol and at least one aromatic dicarboxylic acid.

7. A process as defined in claim 2 wherein the thermoplastic polymer is a polyetherimide.

8. A process as defined in claim 7 wherein the poly(etherimide) polymers is of the following formula:

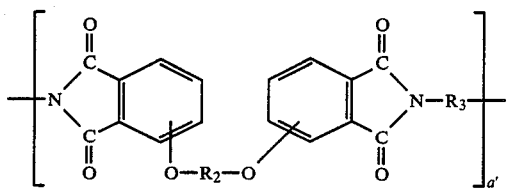

wherein a' is an integer greater than 1, —O—R$_2$—O— is attached to the 3 or 4 and 3' or 4' positions and R$_2$ is selected from (a) a substituted or unsubstituted aromatic radical of the formula:

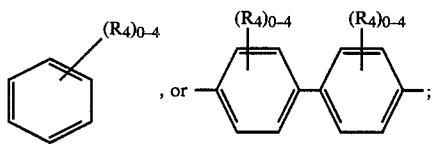

(b) a divalent radical of the formula:

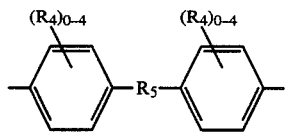

wherein R$_4$ is independently C$_1$ to C$_6$ alkyl, or halogen and R$_5$ is selected from —O—, —S—,

—SO—, —SO$_2$— alkylene of 1 to 6 carbon atoms, cycloalkylene of 4 to 8 carbon atoms, alkylidene of 1 to 6 carbon atoms or cycloalkylidene of 4 to 8 carbon atoms, R$_3$ is selected from aromatic hydrocarbon radical having from 6–20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and C$_2$-C$_8$ alkylene terminated polydiorganosiloxane.

9. A process as defined in claim 2 wherein the thermoplastic polymer is an aromatic polycarbonate.

10. A process as defined claim 9 wherein the aromatic polycarbonate is the reaction product of a dihydric phenol and a carbonate precursor.

11. A process as defined in claim 10 wherein the dihydric phenol is bisphenol-A and the carbonate precursor is carbonyl chloride.

12. A process as defined in claim 10 wherein the dihydric phenol is bisphenol-A and the carbonate precursor is diphenyl carbonate.

13. A process as defined in claim 2 wherein the thermoplastic polymer is poly(ester carbonate).

14. A process as defined in claim 2 wherein the thermoplastic polymer is a styrene polymer.

15. A process as defined in claim 14 wherein the styrene polymer is prepared by polymerizing a conjugated diene monomer or a conjugated diene monomer and monomer copolymerizable therewith or an acrylic acid ester to provide an elastomeric backbone and thereafter grafting at least one grafting monomer onto said backbone.

16. A process as defined in claim 15 wherein the conjugated diene monomer is butadiene and the grafting monomer is selected from styrene, an acrylonitrile, an acrylic acid ester, or mixtures thereof.

17. A process as defined in claim 16 wherein the styrene resin is a butadiene/styrene/acrylonitrile resin.

18. A process as defined in claim 2 wherein the thermoplastic polymer is a poly(alkyl acrylate) polymer.

19. A process as defined in claim 18 wherein the poly(alkyl acrylate) is poly(methyl methacrylate).

20. A process as defined as in claim 19 wherein the poly(alkyl acrylate) is a copolymer of methyl methacrylate and a vinyl monomer wherein the amount of methyl methacrylate is greater than about 70 percent of weight of the copolymer.

21. A process as defined in claim 20 wherein the vinyl monomer is selected from acrylonitrile, N-allylmaleimide, vinyl chloride, N-vinylmaleimide or an alkyl acrylate or methacrylate, wherein the alkyl group contains from 1 to 8 carbon atoms.

22. A process as defined in claim 20 wherein the thermoplastic polymer is a polyurethane.

23. A process as defined in claim 22 wherein the polyurethane is derived from a polyester resin having a molecular weight of at least about 600, an organic diisocyanate, and a low molecular weight chain extender having active hydrogen containing groups which are reactive with the diisocyanate.

24. A process as defined in claim 22 wherein the polyurethane is derived from a polyether, an organic diisocyanate, and a low molecular weight chain extender having active hydrogen containing groups which are reactive with the diisocyanate.

25. A process as defined in claim 24 wherein the polyether is selected from polytetramethylene glycol having an average molecular weight between about 600 and 2000, polypropylene glycol, and polyethylene glycol having a molecular weight above about 600.

26. A process as defined in claim 2 wherein the thermoplastic polymer is poly(vinyl chloride) polymer.

27. A process as defined in claim 2 wherein the thermoplastic polymer is poly(aryl ether).

28. A process as defined in claim 27 wherein the poly(aryl ether) comprises recurring units of the formula:

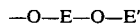

wherein E is the residuum of a dihydric phenol and E' is the residuum of a benzenoid compound having an inert electron withdrawing group.

29. A process as defined in claim 2 wherein the thermoplastic polymer is a copolyetherester block copolymer.

30. A process as defined in claim 29 wherein the copolyetherester block copolymer has a multiplicity of recurring intralinear long chain and short chain ester units connected head-to-tail through ester linkages, said long chain ester units being represented by the following structure:

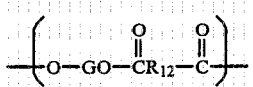

and said short chain ester units being represented by the following structure:

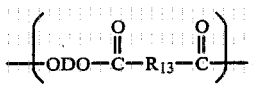

wherein G is a divalent radical remaining after removal of terminal hydroxyl groups from a poly(alkylene oxide) glycol having a molecular weight of from about 400 to about 3500, D is a divalent radical remaining after removal of hydroxyl groups from a low molecular weight diol having a molecular weight of less than about 250; $R_{12}$ is a divalent radical remaining after removal of carboxyl groups from a dicarboxylic acid; with the provisos that the short chain ester units constitute from about 25 to 65% by weight of the copolyester, at least about 70% of the $R_{13}$ groups are 1,4-phenylene radicals, at least about 70% of the D groups are 1,4-butylene radicals, and the sum of the percentages of the $R_{13}$ groups which are not 1,3-phenylene radicals and of the D groups which are not 1,4-butylene radicals does not exceed about 30%.

31. A process as defined in claim 2 wherein the thermoplastic polymer is a polyhydroxyether.

32. A process as defined in claim 31 wherein the polyhydroxyether has the general formula:

wherein F is the radical residuum of a dihydric phenol, F' is a radical residuum of an epoxide selected from mono- and diepoxides containing from 1 to 2 hydroxyl groups and n is an integer which represents the degree of polymerization and is at least about 30.

* * * * *